United States Patent
Konishi et al.

(10) Patent No.: US 7,126,086 B2
(45) Date of Patent: Oct. 24, 2006

(54) CARTRIDGE-TYPE SOLDERING IRON

(75) Inventors: Hirofumi Konishi, Kaizuka (JP); Toshikazu Mochizuki, Sakai (JP)

(73) Assignee: Hakko Corporation, Osaka (JP)

( * ) Notice: Subject to any disclaimer, the term of this patent is extended or adjusted under 35 U.S.C. 154(b) by 38 days.

(21) Appl. No.: 10/958,947

(22) Filed: Oct. 4, 2004

(65) Prior Publication Data
US 2005/0092729 A1 May 5, 2005

Related U.S. Application Data

(63) Continuation-in-part of application No. 10/686,439, filed on Oct. 14, 2003.

(30) Foreign Application Priority Data

| Apr. 4, 2003 | (JP) | ............................... 2003-101427 |
| Apr. 23, 2003 | (JP) | ............................... 2003-118048 |

(51) Int. Cl.
*B23K 3/02* (2006.01)
*H05B 1/00* (2006.01)

(52) U.S. Cl. ..................... 219/229; 219/230; 228/51; 392/384

(58) Field of Classification Search ........ 219/229–234, 219/240–241; 392/379, 383–384; 228/51, 228/55
See application file for complete search history.

(56) References Cited

U.S. PATENT DOCUMENTS

| 4,926,028 | A | | 5/1990 | Fortune |
| 5,054,106 | A | | 10/1991 | Fortune |
| 5,483,040 | A | | 1/1996 | Fortune |
| 5,909,535 | A | * | 6/1999 | Curwick et al. ............ 392/476 |
| 6,247,631 | B1 | | 6/2001 | Kawakatsu et al. |
| 6,633,021 | B1 | | 10/2003 | Matubara |
| 2005/0092729 | A1 | | 5/2005 | Konishi et al. |

FOREIGN PATENT DOCUMENTS

| EP | 536472 | 4/1993 |
| JP | 2000-657 | 1/2000 |
| JP | 2000-33475 | 2/2000 |
| JP | 2001347369 | 12/2001 |
| JP | 2003-001413 | 1/2003 |
| WO | WO 98/30352 | 7/1998 |

* cited by examiner

*Primary Examiner*—Robin O. Evans
*Assistant Examiner*—Stephen J. Ralis
(74) *Attorney, Agent, or Firm*—Squire, Sanders & Dempsey L.L.P.

(57) ABSTRACT

A soldering iron is configured to heat its tip and emit inert gas near the tip. This is accomplished by providing a heater cartridge having a heater pipe with a tip portion and a base portion. The heater pipe has a first hole in the tip portion and a second hole at the base portion. The heater pipe has a passage between the first and second holes so that gas can enter through the second hole and exit through the first hole. The heater cartridge has a grip handle between the tip and base portions of the heater pipe. The soldering iron has a handle base with a cavity adapted to receive the base portion of the heater pipe and at least a portion of the grip handle. The handle base is adapted to provide power and gas to the base portion of the heater pipe. The heater pipe transfers the power and gas from the base portion to the tip portion to heat the tip and emit gas near the tip. The cavity of the handle base is configured to substantially seal gaps between the grip handle and the handle base so that gas does not leak between the handle base and the grip handle.

25 Claims, 10 Drawing Sheets

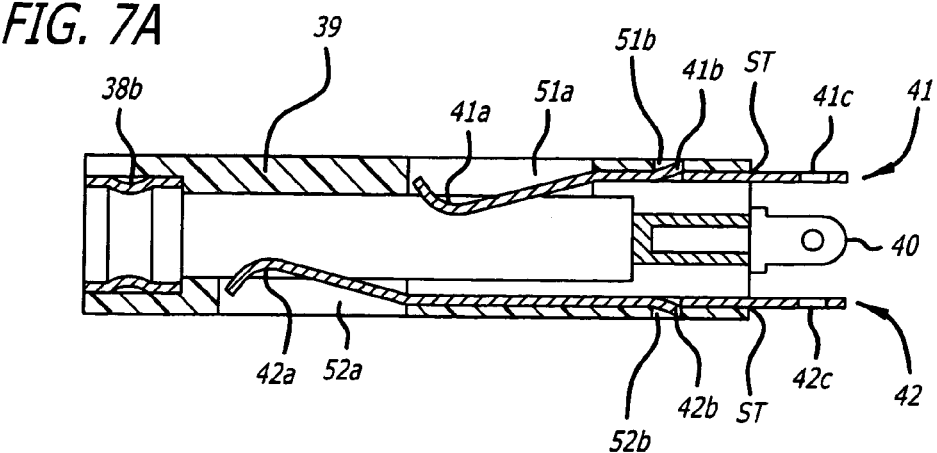
FIG. 7A
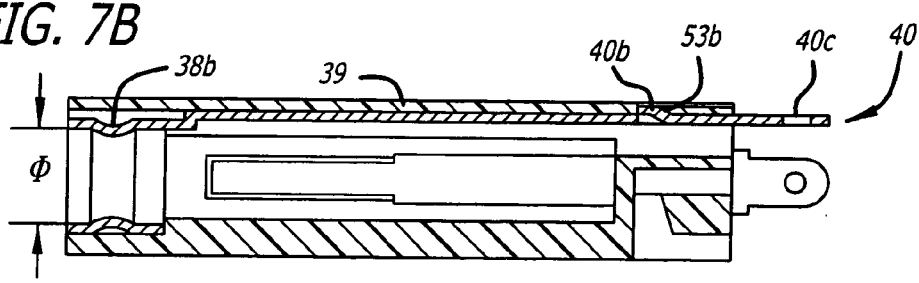
FIG. 7B
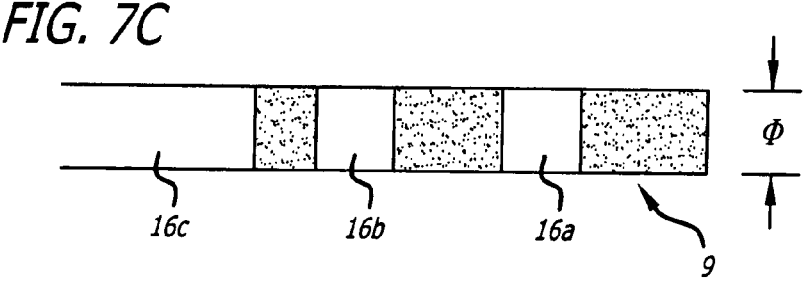
FIG. 7C
FIG. 7D
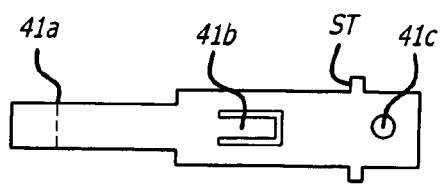
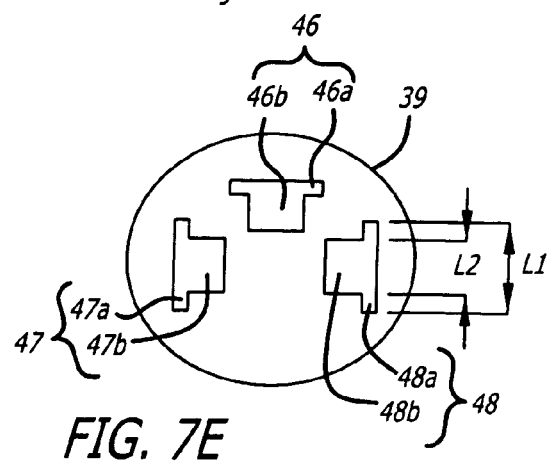
FIG. 7E

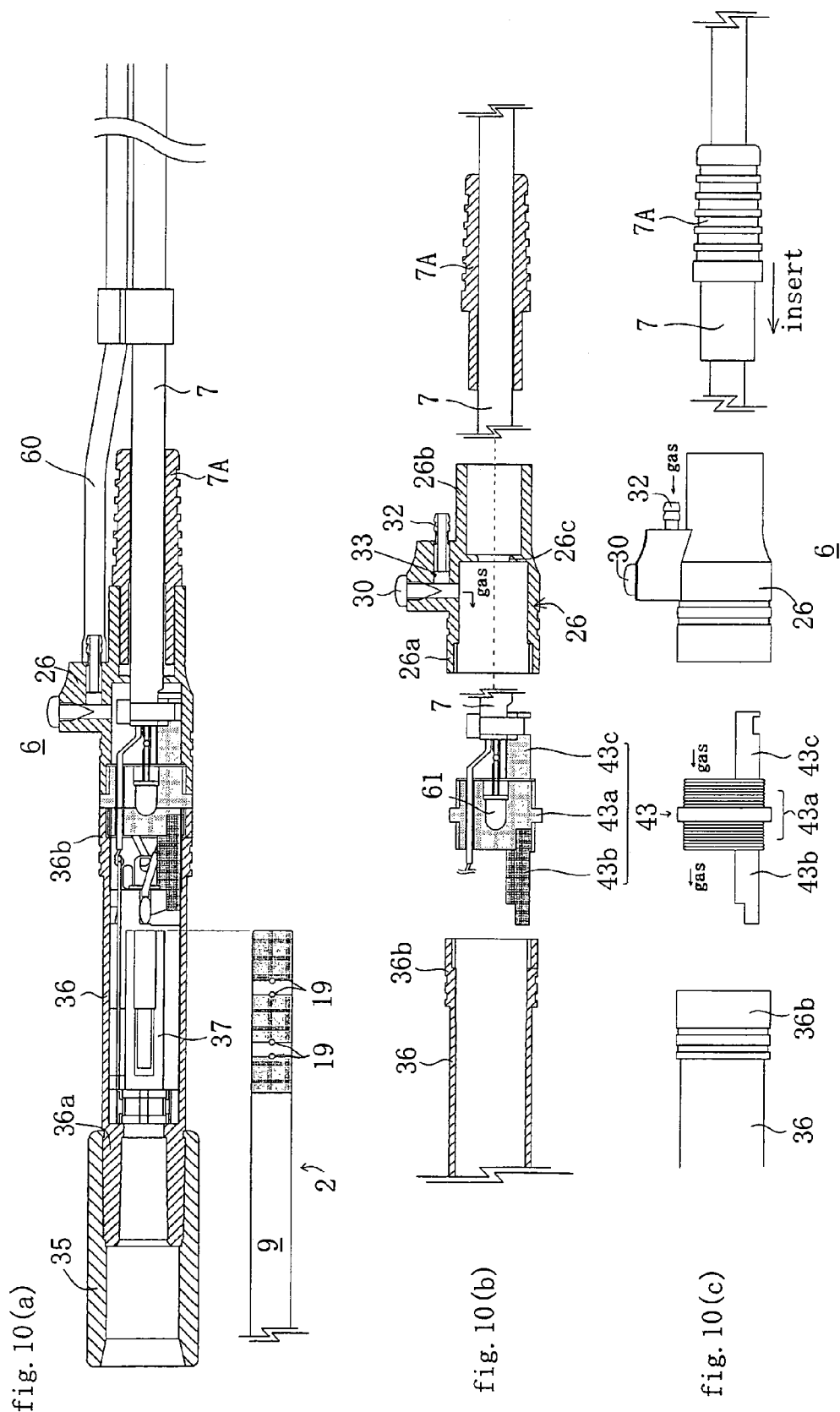

CARTRIDGE-TYPE SOLDERING IRON

RELATED APPLICATIONS

This application is a continuation-in-part of U.S. patent application Ser. No. 10/686,439, filed on Oct. 14, 2003, which claims priority to two Japanese patent applications, (1) 2003-101427, filed Apr. 4, 2003; and (2) 2003-118048, which was filed Apr. 23, 2003, which are all hereby incorporated by reference.

BACKGROUND OF THE INVENTION

1. Field of the Invention

This invention relates to a cartridge-type soldering iron capable of performing soldering operations and emitting inert gas, and more particularly, to a cartridge-type soldering iron capable of soldering operations in a constricted space.

2. General Background and State of the Art

As printed circuit boards are discarded, lead (Pb) embedded in the circuit board can release into the environment. The release of lead into the environment can lead to environmental hazards. To remedy this problem, some have developed soldering compounds that are free of lead. One of the drawbacks with lead free solder, however, is that the melting point of lead-free solder is 30° C. to 50° C. higher than the melting level of 210° C. to 232° C. of lead solder. This means that a soldering tip temperature of 350° C. or higher must be maintained in order to perform soldering operations with lead free solder. With such a high soldering tip temperature, flux in the solder can deteriorate, which can cause rapid oxidation in the soldering tip. As such, when lead free solder is used, the life of the soldering tip is shortened.

Various solutions to the above problems have been proposed, including the methods described in Japanese Utility Model Application Laid-Open No. H6-70962 and U.S. Pat. No. 6,247,631. The preferred method described in No. H6-70962 relates to a cartridge-type soldering iron where threaded solder is supplied automatically. This is accomplished by providing a soldering iron having a heating element with a bent top end, and a handle that intersects with the body of the heater and forcing the thread solder into the bent top end of the heating element. As such, the soldering iron disclosed in the '962 application cannot be applied to a cartridge-type soldering iron where the soldering tip and the handle are arranged in a straight line. In addition, to form a flow path for the inert gas, a cylindrical pipe attached to the heating element projects at an angle from the handle. This cylindrical pipe obstructs precise soldering operations, and it is difficult to precisely position the cylindrical pipe in order to maintain a uniform flow path for the inert gas. The supplied thread solder also hinders the soldering operation, so that it is generally not used in a printed circuit board with a high degree of concentration.

The '631 patent attempts to solve the shortcomings of the '962 application with a cartridge-type soldering iron where the soldering tip and the handle are arranged in a linear configuration. Projections are provided on an outer periphery of the heating element and the inner periphery of the pipe, and the heating element and the pipe are precisely positioned to provide a uniform flow path for the inert gas. However, the plurality of projections on the outer periphery of the heating element and the inner periphery of the pipe in the '631 patent are inherently inefficient. Accordingly, a more easily produced cartridge-type soldering iron is desirable. A cartridge-type Pb-free soldering iron with readily interchangeable soldering tips that can be replaced by the user without special tools is also highly desirable.

INVENTION SUMMARY

This invention provides a soldering iron that heats the tip and emits inert gas near the tip. This is accomplished by providing a heater cartridge having a top or tip end and a base end with a soldering tip at the top end, an input opening closer to the base end and an output opening closer to the top end. The soldering iron also includes a gas injector having a gas chamber adapted to receive the heater cartridge such that the input opening of the heater cartridge is within the gas chamber so that gas is injected into the input opening. At least a portion of the top end and the output opening of the heater cartridge is enclosed with an exhaust pipe to form a gas passage between the outer surface of the heater cartridge and the exhaust pipe. As such, gas injected through the input opening passes through the opening within the heater cartridge and exit through the output opening, then pass through the gas passage and emit through an outlet defined by the space between the top end and the exhaust pipe to provide inert gas near the tip.

The soldering iron described above works efficiently and conveniently even at high temperatures, while preventing oxidation of the soldering tip. Further, according to the invention, in its assembled state, a uniform gas flow path can be formed around the heating element of the cartridge-type soldering iron without creating obstacles to the use of the soldering iron in constricted spaces. The invention also makes possible a much more compact cartridge-type soldering iron, further aiding in the performance of precise soldering operations, and can perform soldering operations while emitting inert gas.

Other systems, methods, features and advantages of the invention will be or will become apparent to one with skill in the art upon examination of the following figures and detailed description. It is intended that all such additional systems, methods, features and advantages be included within the description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIG. 7(a) is a cross-sectional view of the conductive part shown in FIG. 6(a) taken along a line C—C.

FIG. 7(b) is a cross-sectional view along the line B—B of the conductive part in FIG. 6(a).

FIG. 7(c) is a close up view of the base end of the heater cartridge.

FIG. 7(d) is a close up view of the terminal plate.

FIG. 7(e) is a close up view of the base end of the terminal body.

FIG. 10(a) is an enlarged view of a handle base, a connection and a gas injector in their assembled state;

FIG. 10(b) is a partial cross-sectional view showing the handle base, the connection and the gas injector in their separated state; and FIG. 10(c) is a front view showing the handle base, the connection and the gas injector in their separated state.

DETAILED DESCRIPTION OF THE PREFERRED EMBODIMENTS

Figure 1:
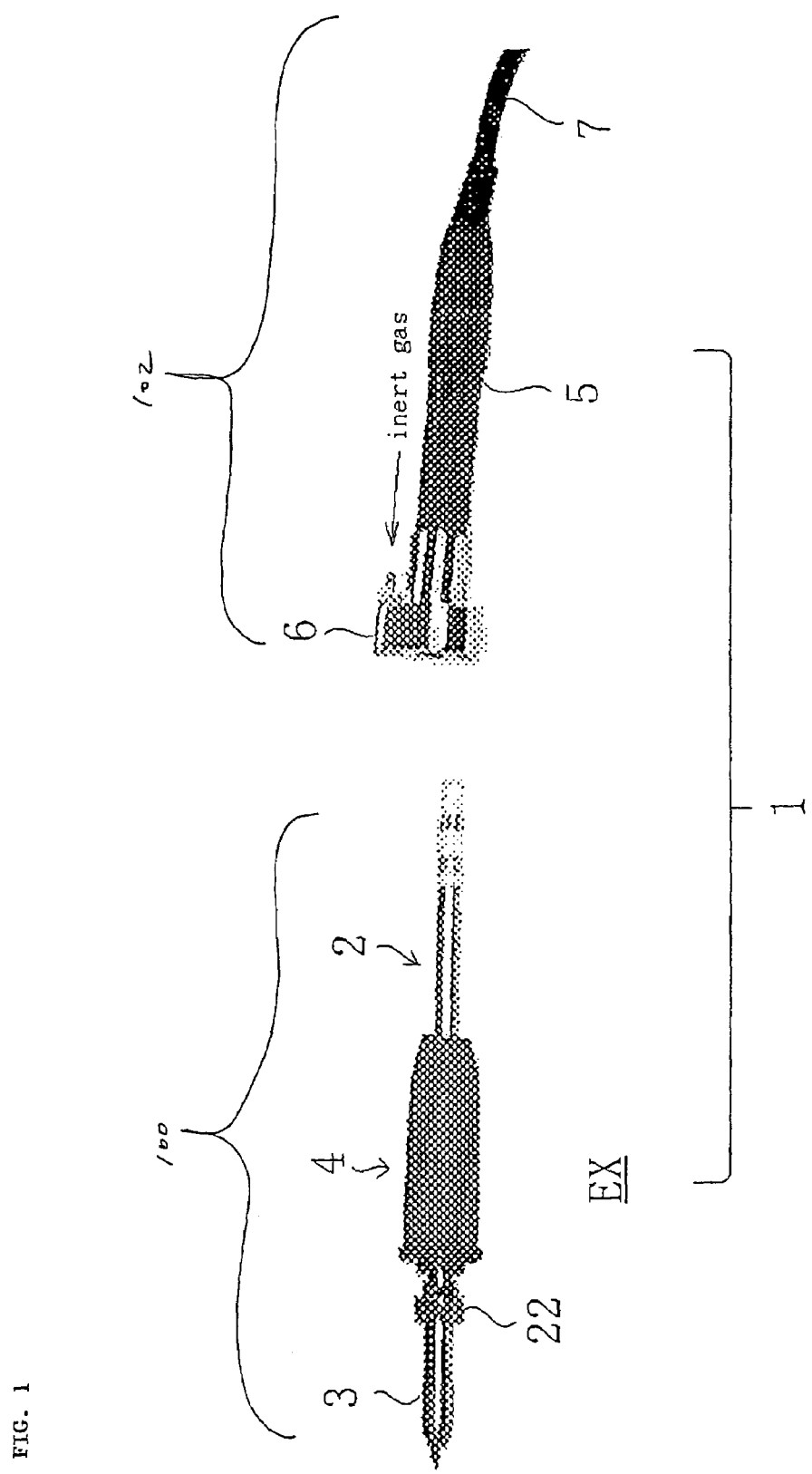
FIG. 1 is a perspective view showing the cartridge-type soldering iron in a disassembled state.
Figure 2:
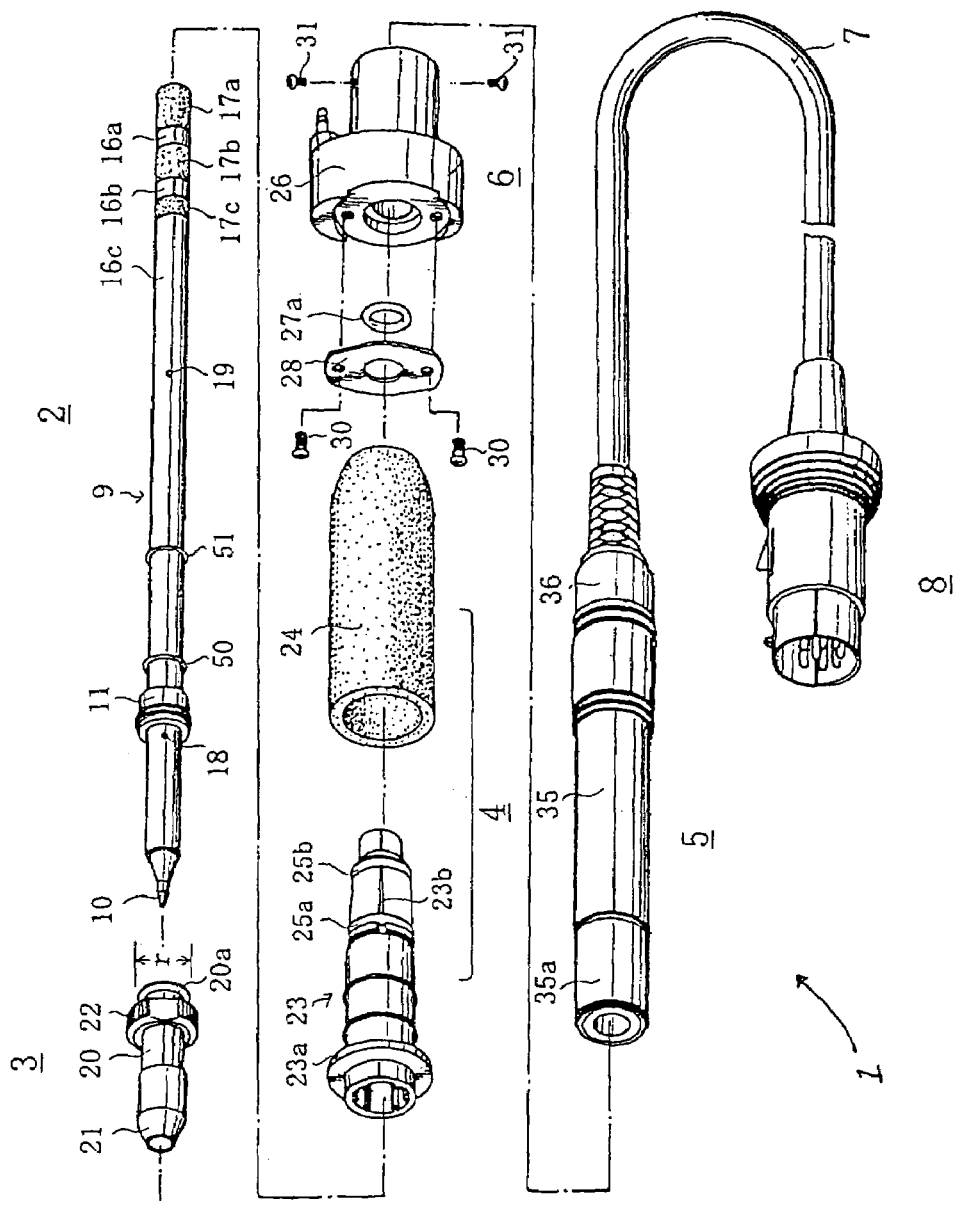
FIG. 2 is a perspective view showing the disassembled elements of a cartridge-type soldering iron according to an embodiment.

FIG. 1 illustrates a cartridge-type soldering iron (soldering iron) 1 including an exchange member 100 and a connector member 102 adapted to receive the exchange member 100. FIG. 2 is a perspective view illustrating the disassembled elements of the soldering iron 1. The exchange member 100 includes a heater cartridge 2, a gas-exhaust pipe 3 capable of coupling to a top or tip end of the heater cartridge 2, and a grip handle 4 configured to receive the heater cartridge 2. The grip handle 4 couples to the heater cartridge 2 along a central portion of the heater cartridge 2. The connector member 102 includes a handle base 5 with an inner configuration adapted to receive the base end of the heater cartridge 2 and the outer surface configured so that the top end of the handle base 5 is enclosed within a gas injector 6. The connector member 102 further includes the gas injector 6 coupled to the handle base 5 for injecting inert gas into the heater cartridge 2, and an electric connector 8 positioned on a terminal end of cable 7 that extends from the handle base 5.

An inert gas supply tube (not shown) is coupled to the gas injector 6. As such, when the soldering operation is to be changed, the operation can be carried out continuously only by exchanging the exchanging member 100. The gas exhaust pipe 3 is coupled to the heater cartridge 2 from the front, and a grip handle 4 is coupled to the heater cartridge 2 from the behind. As a result, the gas exhaust pipe 3, the heater cartridge 2, and the grip handle 4 are assembled as an integral unit.

When the assembly comprising the gas exhaust pipe 3, the heater cartridge 2, and the grip handle 4 is inserted into the handle base 5, the cartridge-type soldering iron 1 is fully assembled. In this case, the base end of the grip handle 4 is abut against the top end of the gas injector 6, thereby preventing the excessive insertion of the heater cartridge 2. In this configuration, minimal stress if any may be applied to the base end of the heater cartridge 2. The gas exhaust pipe 3, the heater cartridge 2, and the grip handle 4 is integrally formed and this formation may be prepared as an exchange member 100. Alternatively, the heater cartridge 2 to which the gas exhaust pipe 3 is coupled may be prepared as the exchange member 100.

Once the connection member 102 is assembled, the base end of the grip handle 4 is in contact with the gas injector 6, and the contact point between the grip handle 4 and the gas injector 6 is closer to the top end than the center point of the entire length of the cartridge-type soldering iron 1. The diameter of the grip handle 4 is the proper size to be gripped comfortably by three fingers (thumb, index and middle finger) and the grip handle 4 is manufactured of material of appropriate elasticity. Therefore, intricate soldering operations may be performed on highly integrated printed circuit boards.

Figure 3:
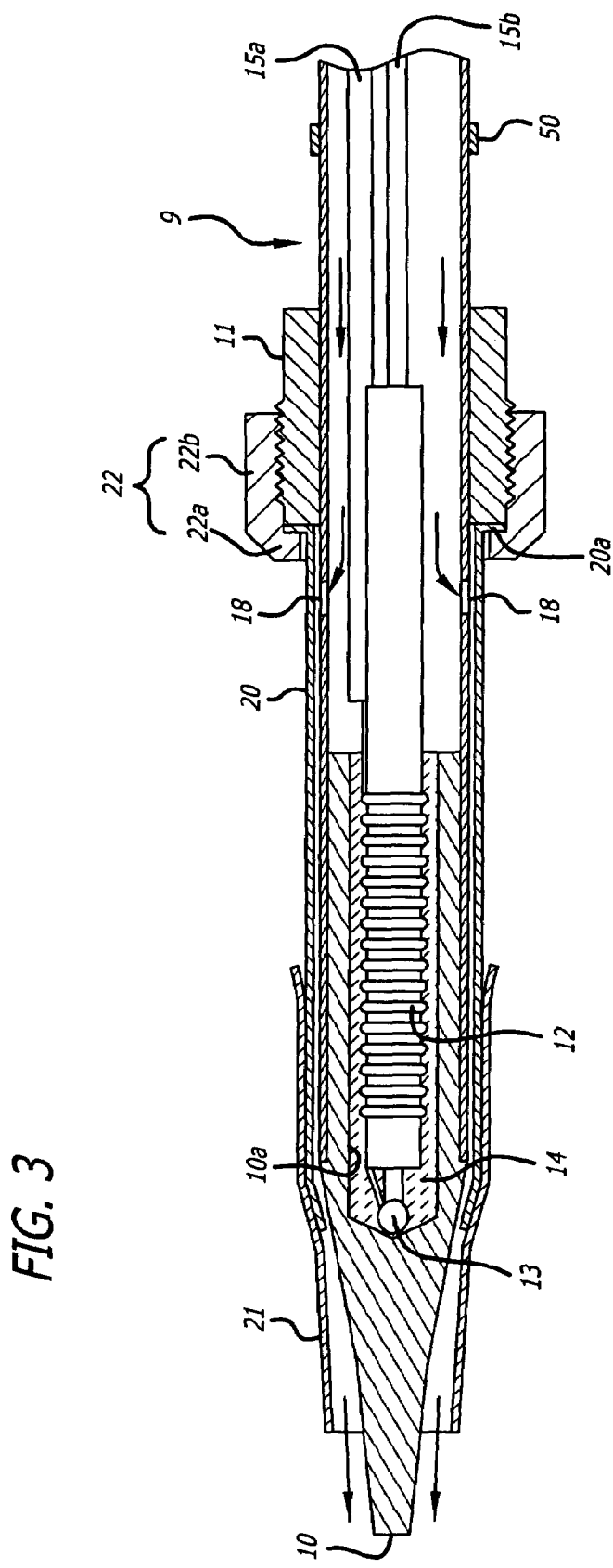
FIG. 3 is a cross-sectional view of the front end of the cartridge-type soldering iron shown in FIG. 1.

As shown in FIGS. 2 and 3, the heater cartridge 2 includes a cylindrical, conductive hollow pipe 9, a soldering tip 10 coupled to the top or tip end of the hollow pipe 9, a mounting part 11 coupled to an outer periphery of the hollow pipe 9, and a heater part 12 inserted into a mounting hole 10a of the soldering tip 10. The heater part 12 is provided with a temperature sensor 13 at its top end. The heater part 12 and the temperature sensor 13 are held in position by a ceramic coat material 14 filled in the mounting hole 10a. The ceramic coat material 14 may be solidified water solution including binder and alumina, or any other insulatory material known to one skilled in the art.

FIG. 3 illustrates that two conductors 15a and 15b extend from the heater part 12 passing through the hollow pipe 9. The two conductors 15a and 15b are electrically connected to annular terminals 16a and 16b on the base end side of the hollow pipe 9. The base end of the heater cartridge 2 is substantially closed with an insulation material 17a (as shown in FIG. 2). The base end of the heater cartridge 2 is hermetically sealed in the handle base 5 when the soldering iron 1 is in use, so that inert gas injected into the hollow pipe 9 does not leak from the handle base 5. As explained below, the base end side of the handle base 5 is substantially closed, and the top end side thereof is hermetically sealed by the hollow pipe 9 and the elastic body 27b.

In the base end of the hollow pipe 9, insulation materials 17b and 17c are respectively disposed between the annular terminal 16a and the annular terminal 16b, and between the annular terminal 16b and the pipe body 16c, such that the three members 16a, 16b and 16c are electrically insulated from one another. The pipe body 16c of the hollow pipe 2 is electrically connected to the soldering tip 10.

FIGS. 2 and 3 illustrate that the pipe body 16c is formed with a plurality of (e.g., four) first holes 18 located near the top side of the mounting part 11, and is formed with a plurality of (e.g., two) second holes 19 at locations corresponding to the gas injector 6. Inert gas is injected into the hollow pipe 2 through second holes 19, and discharged through first holes 18. The second holes 19 are separated from each other along the same circumference of the pipe body 16c. The first holes 18 are separated away from one another in an axial direction and in a circumferential direction of the pipe body 16c. Two projections 50 and 51 are provided between the rear end and the mounting part 11 of the pipe body 16c. The outer peripheral diameters of the projections 50 and 51 are substantially the same as an inner peripheral diameter of the grip handle 4 so that the outer periphery of the projection 50 is substantially fit within an inner periphery of the grip handle 4. As a result, deflection between the grip handle 4 and the heater cartridge 2 along the radial direction is substantially prevented.

The projection 51 engages with a step (not shown) formed in the inner periphery of the grip handle 4 when the grip handle 4 is inserted from the rear end of the heater cartridge 2 so that the projection 51 positions the grip handle 4 in a predetermined position along the axial direction. That is, before the top end of the grip handle 4 comes into contact with the mounting part 11, the projection 51 prevents the grip handle 4 from being further inserted.

FIG. 3 illustrates that the gas exhaust pipe 3 includes a plurality of portions: an inner portion 20; an outer portion 21; and a box nut 22. The inner portion or pipe 20 is slightly larger in diameter than the hollow pipe 9. The outer portion or pipe 21 is tightly fitted around the outside of the top end of the inner pipe 20. The cylindrical box nut 22 is movably fitted into an outer periphery of the inner pipe 20. The top end of the outer pipe 21 is tapered to conform to the shape of the soldering tip 10. The inner pipe 20 is formed at its base end with a flange part 20a which has a large diameter formed into an annular shape diametrically outward. To accommodate a plurality of differently shaped soldering tips designed to accomplish various different soldering operations, a plurality of differently shaped outer pipe 21 to fit different soldering tip 10 may be provided.

As shown in FIG. 3, the box nut 22 is divided into the top end 22a and the base end 22b, which have different inner peripheral diameters. An inner peripheral surface of the base end 22b is formed with a threaded groove corresponding to the mounting part 11. The inner peripheral diameter of the top end 22a is greater than an outer diameter of the inner pipe 20. The inner peripheral diameter of the top end 22a is smaller than the outer diameter of the flange part 20a of the inner pipe 20 and the outer diameter of a base end of the outer pipe 21. As such, the box nut 22 is not detached from the inner pipe 20 either in its forward or backward direction.

The inner peripheral diameter of the base end 22b of the box nut 22 is substantially the same as the outer peripheral diameter (r) of the flange part 20a. Contact surfaces between the top end 22a of the box nut 22 and the mounting part 11 which abut against the front and rear surfaces of the flange part 20a intersect with an axial direction of the hollow pipe 9 at right angles in correspondence with the flange part 20a. As such, if the box nut 22 is screwed onto the mounting part 11 and the flange part 20a is pushed against the contact surface of the mounting part 11, the inner pipe 20 is positioned correctly with respect to the box nut 22 as shown in FIG. 3. Once the box nut 22 is screwed, the box nut 22, the mounting part 11 and the inner pipe 20 are integrally coupled so that the inner pipe 20 is positioned correctly with respect to the hollow pipe 9, thereby forming a uniform gap between the inner pipe 20 and the hollow pipe 9, to provide a gas passage.

With the soldering iron described above, unlike U.S. Pat. No. 6,247,631, it is unnecessary to provide a positioning projection on the inner peripheral surface of the inner pipe 20 or the outer peripheral surface of the hollow pipe 9, to provide a uniform gas passage. FIG. 3 illustrates that inert gas introduced from the first holes 18 passes through the gas passage formed between the hollow pipe 9 and the inner pipe 20 toward the top end, reaches a gas passage formed between the outer pipe 21 and the soldering tip 10, and is emitted toward an operation surface. Since the inert gas is emitted as described above, the oxidation of the soldering tip is minimized. The base end of the gas passage is closed by tight contact between the flange part 20a and the mounting part 11.

As shown in FIG. 2, the grip handle 4 is comprised of a plastic inner cylindrical body 23 and an elastic polymer outer cylindrical body 24 enclosing the plastic inner cylindrical body 23. In this embodiment, PVC (polyvinyl chloride) is used as the elastic polymer, but other elastomers, including rubber, may be used. The inner cylindrical body 23 and outer cylindrical body 24 are made of material having low thermal conductivity so that the outer cylindrical body 24 can be comfortably grasped by the user. Different colors of elastic polymer of the outer cylindrical body 24 may be used to distinguish a plurality of different outer cylindrical bodies.

The inner cylindrical body 23 is provided with a flange part 23a which receives the insertion of the outer cylindrical body 24. The rear end of inner cylindrical body 23 is axially notched by a plurality (in one embodiment, four) of notched grooves 23b in the axial direction. The elastic body rings 25a and 25b are fitted around the notched grooves 23b. The elastic body rings 25a and 25b reduce the diameter of the end of the inner cylindrical body 23, which are then inserted into outer cylindrical body 24. In this manner, cylindrical body 23, and cylindrical body 24 are combined to form the grip handle 4. When inner cylindrical body 23 is inserted into outer cylindrical body 24 they are integrally coupled, then this assembly may receive the hollow pipe 9. Outer cylindrical body 24 has an appropriate elasticity, and its outer diameter is of a size to be comfortably grasped by three fingers (the thumb, index and middle fingers).

While the diameter of hollow pipe 9 may be small in accordance with degree of integration of IC mounted on a printed circuit board, the diameter of outer cylindrical body 24 is adapted to fingers of an operator. Further, the contact point between outer cylindrical body 24 and the gas injector 6 is slightly closer to the tip than the central point of the soldering iron 1. As a result, the soldering iron 1 is more comfortable to use in soldering operations.

Figure 4C:
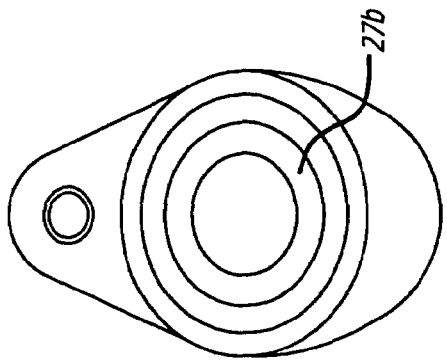
FIG. 4(c) is a rear view of the gas injecting device of FIG. 4(a).
Figure 4A:
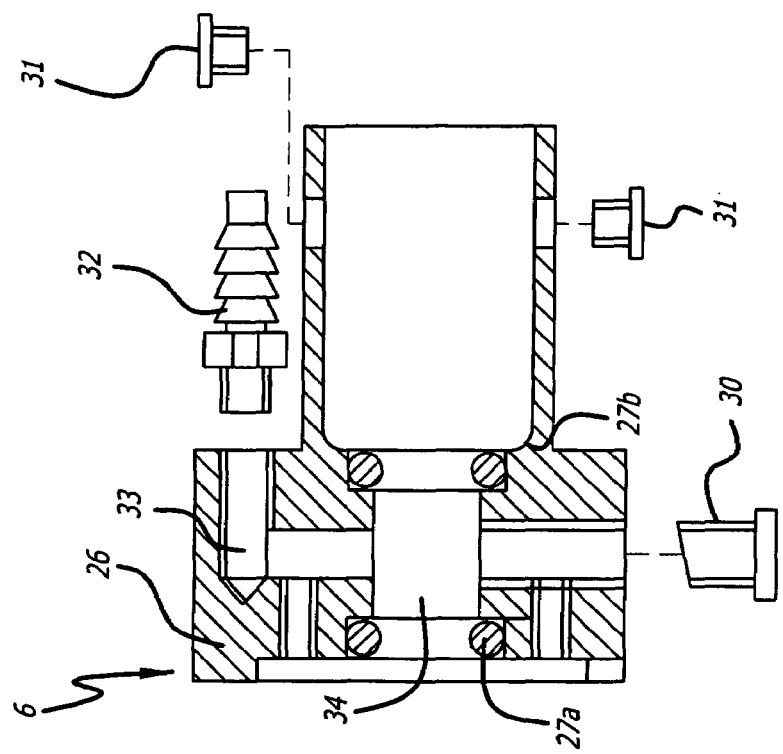
FIG. 4(a) is a cross-sectional view of a gas injecting device of FIG. 2.
Figure 4B:
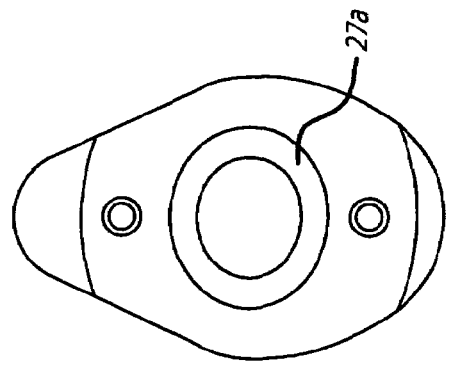
FIG. 4(b) is a front view of the gas injecting device of FIG. 4(a).

FIG. 4 illustrates that the gas injector 6 includes a sealing screw 30. The top end and base end of the charging body 26 are hermetically sealed by O-rings 27a and 27b. O-ring 27a is held by a pushing plate 28(FIG. 2), and the O-ring 27b is held in place by the top end surface of handle base 5. The base end of charging body 26 is cylindrical in order to receive handle base 5, and the handle base 5 is fixed in place by holding screws 31. The charging body 26 has a mounting opening 33 into which an introducing member 32 is inserted. Inert gas introduced through the introducing member 32 moves inward and then reaches a central gas chamber 34.

The inert gas used with the soldering iron 1 may be nitrogen gas. The inert gas is supplied through a tube (not shown) coupled to the introducing member 32. The tube is disposed along the axial direction of the soldering iron to not obstruct with soldering operations. The supply of inert gas through the tube member mounted to introducing member 32 is controlled by an ON/OFF toggle switch (not shown).

The diameter of gas chamber 34 is slightly greater than that of hollow pipe 9. When hollow pipe 9 is inserted into gas chamber 34, the ends of gas chamber 34 are sealed by O-rings 27a and 27b. When hollow pipe 9 is inserted into handle base 5, the second holes 19 of hollow pipe 9 are located at the gas chamber 34. As such, the inert gas in gas chamber 34 passes through the second holes 19 into hollow pipe 9. With the top end and the base end of hollow pipe 9 being sealed as discussed above, the inert gas is discharged from the holes 18.

Figure 5A:
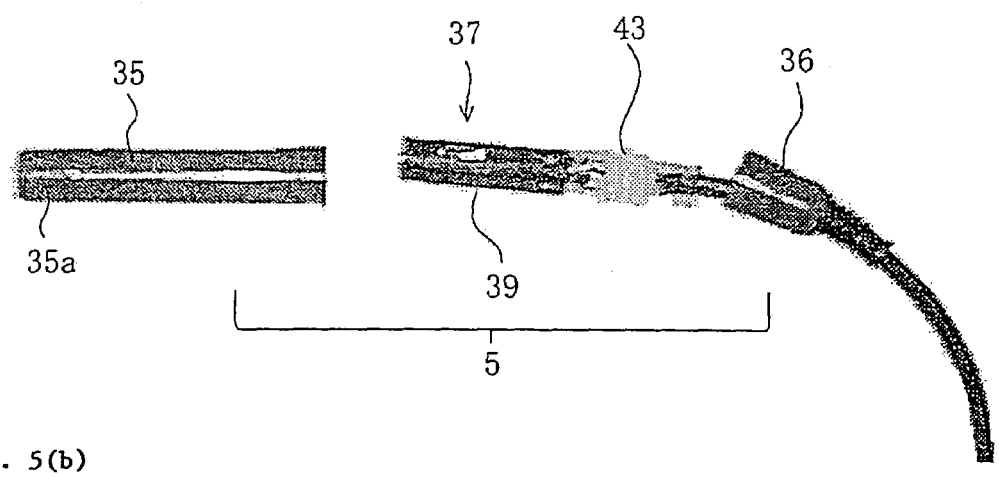
FIGS. 5(a) through 5(C) are side view of a handle portion of the soldering iron.
Figure 5B:
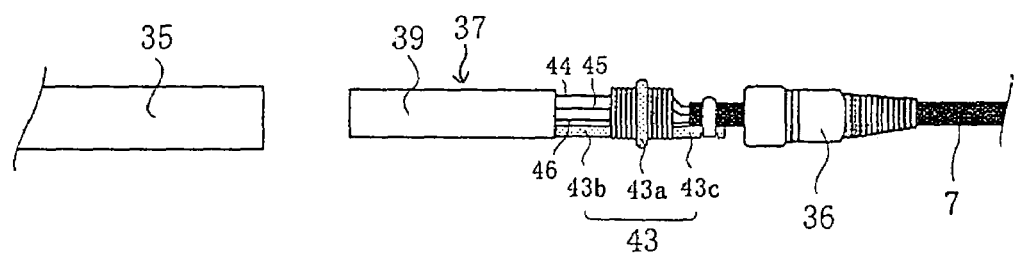
Figure 5C:
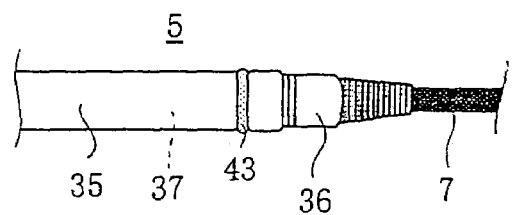

FIGS. 5(a) through 5(c) illustrate a cylindrical first part 35 opened at both axial ends, and a cap-shaped second part 36 is screwed onto the linkage part 43, providing a handle base 5. The first part 35 includes an electrical connector assembly 37. When the top end 35a is inserted into the base end of the body 26 of a gas injector part 6, the top end 35a makes contact with elastic body 27b. Therefore, when the heater cartridge 2 is inserted into the handle base 5, a secure seal is formed by the outer periphery of the hollow pipe 9 and the elastic body 27b.

FIG. 5(a) illustrates that the handle base 5 is separated into first part 35 and second part 36. The base end of second part 36 is closed by cable 7 inserted into this base end and leads 44, 45, 46 are derived from cable 7 as shown in FIG. 5(b). In order to close the base end of second part 36 securely, a sealing member may be adhered to the outer periphery of the cable 7 and forcibly inserted into the base end of second part 36.

The linkage part 43 includes a body 43a having screw grooves in axial opposite ends and attachment plates 43b, 43c projecting frontward and rearward in an axial direction from the body 43a. The body 43a has three penetration holes passing three leads 44, 45 and 46. The attachment plate 43c couples to the top end of the cable 7 from the second part 36, and the attachment plate 43b couples the linkage part 43 with the electrical connector assembly 37.

Figure 6A:
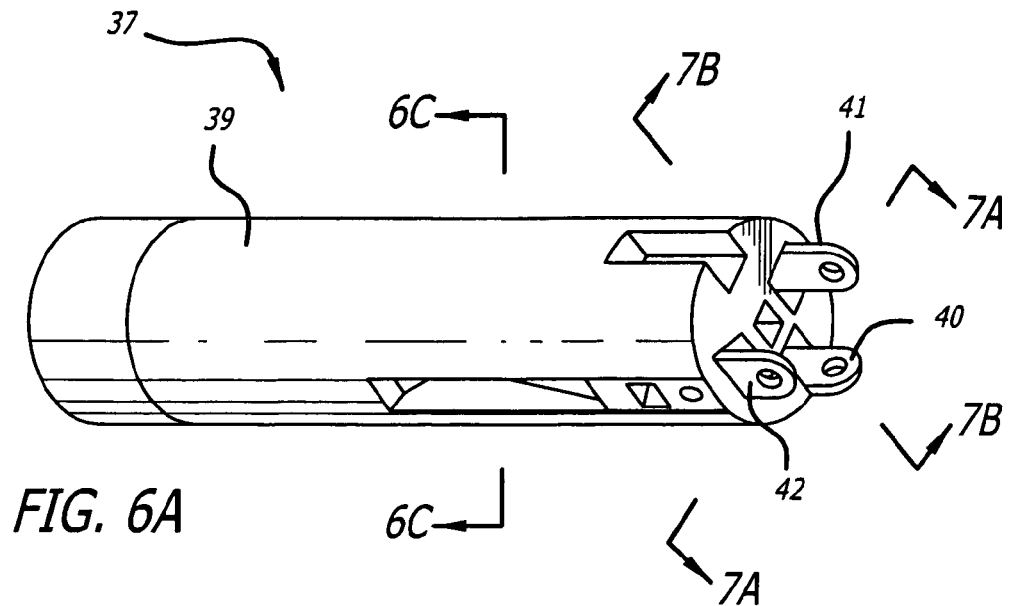
FIG. 6(a) is a perspective view of the conductive part embedded in the handle portion.

FIG. 6(a) illustrates that the electrical connector assembly 37 is formed with a ground terminal plate 40, a first terminal plate 41, and a second terminal plate 42 built into a plastic terminal body 39 of the electrical connector assembly 37. Although not shown, the ground terminal plate 40, the first terminal plate 41, and the second terminal plate 42, are respectively connected with the leads 44, 45, 46 derived from the cable 7 and passing through body 43a.

FIG. 7(e) illustrates that the terminal body 39 is cylindrical, and an installation hole 46 corresponding to the terminal plate 40, an installation hole 47 corresponding to the terminal plate 41, and an installation hole 48 corresponding to the terminal plate 42 are formed in the base end side of the terminal body 39. Each installation hole 46, 47 and 48 is respectively divided into installation groove 46a, 47a and 48a, with a breadth of L1, and installation openings 46b, 47b and 48b, with a breadth of L2. The first terminal plate 41 is inserted from the installation hole 47 at the base end of terminal body 39 toward the top end, and the second terminal plate 42 is inserted from the installation holes 48 toward the top end. The first and second terminal plates 41 and 42 are thus fixed to the terminal body 39.

FIG. 7(a) illustrates that the first rectangular windows 51a and 51b and the second rectangular windows 52a and 52b are formed in the terminal body 39 in a radially symmetric direction. The third rectangular window 53b is 90 degrees apart from windows 51b and 52b as shown in FIG. 7(b). The first rectangular windows 51a and 51b correspond to the first terminal plate 41, the second rectangular windows 52a and 52b correspond to second terminal plate 42, and the third rectangular window 53b corresponds to ground terminal plate 40.

As shown in FIGS. 7(a) and 7(c), the inner diameter φ' of terminal body 39 is the same as or slightly greater than the outer diameter φ of hollow pipe 9. The axial length of terminal body 39 is sufficient to contain two annular terminals 16a, 16b and the base end of handle body 16c.

The ground terminal plate 40 shown in FIG. 7(b) extends to the top end side of the terminal body 39 and couples with the annular electrical conductor 38. In FIG. 6(a), the annular electrical conductor 38 is made of an elastic material and a notch 38a is formed throughout an axial direction in a part of its circumference. Therefore, annular electrical conductor 38 becomes radially telescopic. When contracted, the annular electrical conductor 38 is inserted into terminal body 39, and spreading more or less in a radial direction, the annular electrical conductor 38 is securely inserted into the terminal body 39.

As shown in FIG. 7(a), in the axial center of the annular electrical conductor 38, a small diameter projection 38b projects inward radially around the entire circumference. The inner diameter of small diameter projection 38b is slightly smaller than the outer diameter φ of hollow pipe 9. Therefore, when heater cartridge 2 is inserted into handle base 5, the small diameter projection 38b extends slightly in an axial direction or outward in a radial direction by the hollow pipe 9. Thus, small diameter projection 38b contacts and holds the hollow pipe 9 securely.

FIGS. 7(a) and 7(c) illustrate that the projection 38b is formed in a position of contact with the pipe body 16c. As such, the electrically secure ground terminal 40 is connected with the pipe body 16c through the small diameter projection 38b when the heater cartridge 2 is inserted into handle base 5. Further, the ground terminal 40 is inserted from the top end of the terminal body 39 (see the left side of FIG. 7) into the base end and a projecting cut piece 40b of ground terminal plate 40 is engaged with the third small window 53b of the terminal body 39. Thus, the insertion is completed as shown in FIG. 7(b).

The first terminal plate 41 is smaller than the second terminal plate 42, and both plates are made of an elastic material. In FIG. 7(d), the first and second terminal plates 41 and 42 comprise bodies, top ends and base ends. The width of terminal plates 41 and 42 is almost the same as the width L1 of installation holes 47a, 48a. The width of the top ends of terminal plates 41 and 42 is slightly smaller than the width L2 of installation openings 47b and 48b. The base ends of the terminal plates 41 and 42 provide stoppers ST to prevent excessive insertion. As shown in FIG. 7(d), projecting cut piece 41b is formed in the body of first terminal plate 41, and the stopper ST and an opening 41c connected with the lead 45 are formed in the base end of first terminal plate 41. Likewise, the projecting cut piece 42b is formed in the body of the second terminal plate 42 and the stopper ST and an opening 42c are formed in the base end of second terminal plate 42, as shown in FIG. 7(a).

When the first terminal plate 41 and the second terminal plate 42 are inserted into the installation holes 47 and 48, the plates 41 and 42 slide into installation grooves 47a and 48a respectively, and the stoppers ST come into contact with terminal body 39. In this state of contact, projecting cut pieces 41b and 42b are engaged with rectangular windows 51b and 52b of terminal body 39, respectively, to securely hold terminal plates 41 and 42.

FIG. 7(a) illustrates that the tops of terminal plates 41 and 42 are bent radially inward. In a free state, the bent parts 41a, 42a are located inside the outer diameter of the hollow pipe 9. In FIG. 7(c), with hollow pipe 9 inserted, bent part 41a of the first terminal plate 41 makes contact with annular terminal 16a and bent part 42a of the second terminal plate 42 makes contact with the annular terminal 16b.

The first terminal plate 41 makes an electrically secure connection with annular terminal 16a and the second terminal plate 42 makes an electrically secure connection with annular terminal 16b. In this manner, when terminal plates 41 and 42 are supported, bent parts 41a and 42a of the top end only swing and terminal plates 41 and 42 of this embodiment receive no pressure from the hollow pipe 9. Therefore, the stress due to the insertion of the hollow pipe is substantially minimized.

The electrical connection is made by bringing the two terminal plates 41, 42 of different lengths into contact with the two annular terminals 16a, 16b respectively. No rotational orientation is necessary when the heater cartridge 2 is inserted. With this invention, the complexity of inserting the heater cartridge 2 into the electrical connector assembly 37 may be minimized. Moreover, in a state in which the hollow pipe 9 is inserted, the ground terminal 40 is securely connected making an electrical contact with the pipe body 16c as explained above.

The outer diameter of the hollow pipe 9 is almost the same as the inner diameter of terminal body 39, such that the hollow pipe 9 is held loosely within terminal body 39. On the other hand, the pipe body 16c spaced properly from the base of the pipe is held securely over its entire length by annular electrical conductor 38. As such, when hollow pipe 9 is inserted into the electrical connector assembly 37, the hollow pipe 9 is held securely by electrical connector assembly 37. That is, with the length of the terminal plate 41 being different from that of the terminal plate 42, the distance from the base end of the electrical connector assembly 37 to small diameter projection 38b inevitably becomes long, so that hollow pipe 9 can be more securely held.

As shown in FIG. 1 the grip handle 4 and handle base 5 are separated. When hollow pipe 9 is inserted into the grip handle 4, heater cartridge 2, gas exhaust pipe 3, and the grip handle 4 are combined as a single unit. As such, the soldering iron 1 is used for a variety of operations by replacing the exchange member 100 comprised of heater cartridge 2, gas exhaust pipe 3 and grip handle 4. That is, when a soldering tip 10 is to be changed, the assembly comprising a heater cartridge 2, gas exhaust pipe 3 and grip handle 4 may be pulled out integrally. And an exchange member 100 comprising another soldering tip 10, may be inserted into gas injector 26 and handle base 5. In addition, to expedite the selection of an appropriate soldering tip, the cylindrical body 24 of grip handle 4 of each exchange member 100 may be made of a different color material.

In addition to the exchange member 100 described above, another exchange member may be constructed with the gas exhaust pipe 3 and the heater cartridge 2, both integrally coupled. Such exchange member, the heater cartridge 2 of the exchange member is inserted into grip handle 4 which has been used heretofore and grip handle 4 is used as it is.

The grip handle 4 is detachably fitted over the heater cartridge 2, so that it is possible to produce a grip handle having the shape, size, color and material desired by a user. Further, since each user may have a personal grip handle, sanitation level is high, and when the grip handle becomes worn it may be replaced without having to replace the entire cartridge-type soldering iron, thereby reducing costs.

It is understood by those skilled in the art that various changes and modifications may be made in the invention without departing from the spirit and scope thereof. For example, although the cartridge-type soldering iron in which the grip handle 4 and the handle base 5 can be separated from each other, the present invention can also be applied to a cartridge-type soldering iron in which the grip handle 4 and the handle base 5 are integrally coupled with each other, and then the heater cartridge 2 is inserted into the integral grip handle 4 and handle base 5.

Figure 8:
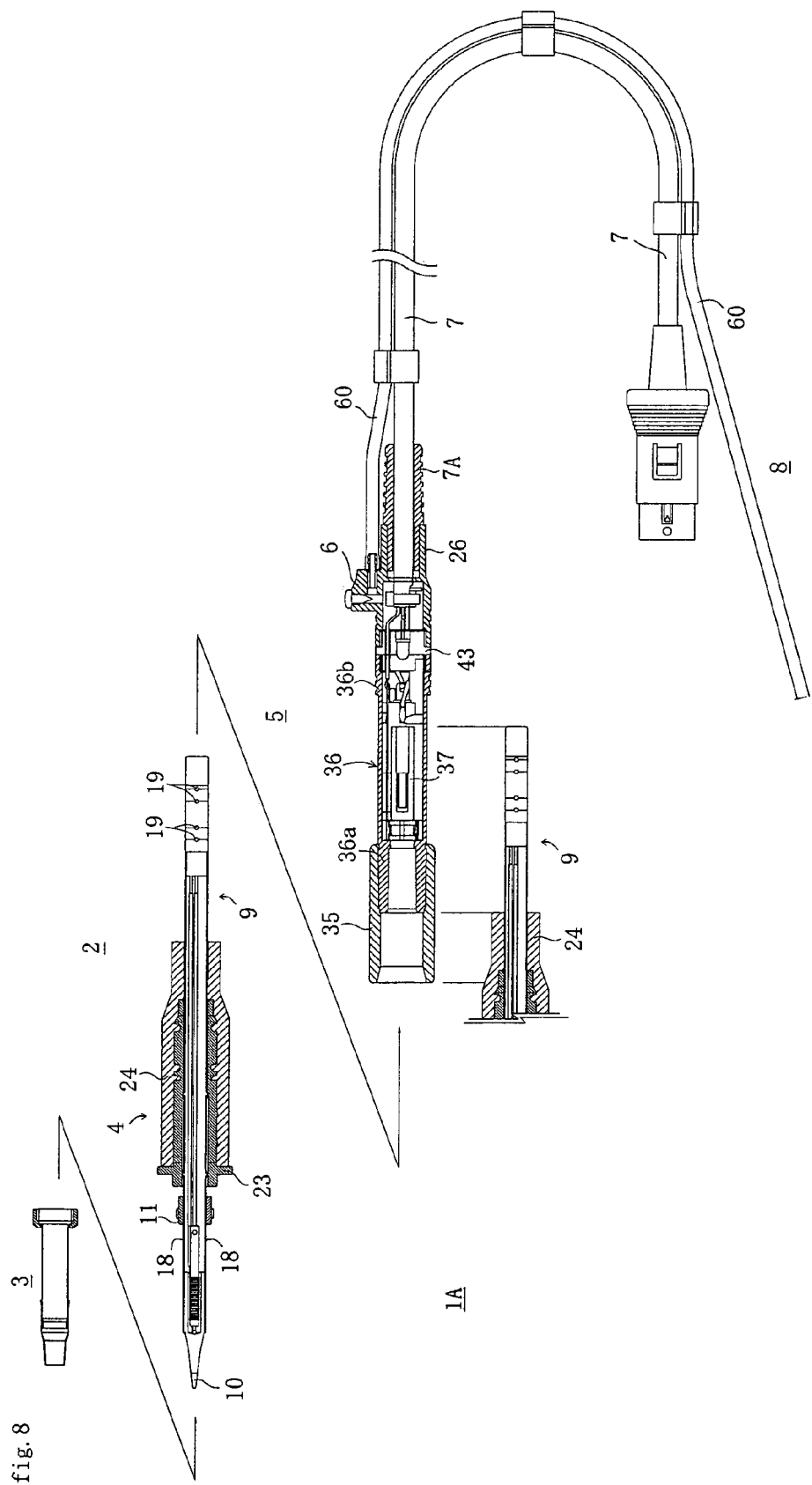
FIG. 8 is an exploded view of a soldering iron according to a second embodiment.
Figure 9:
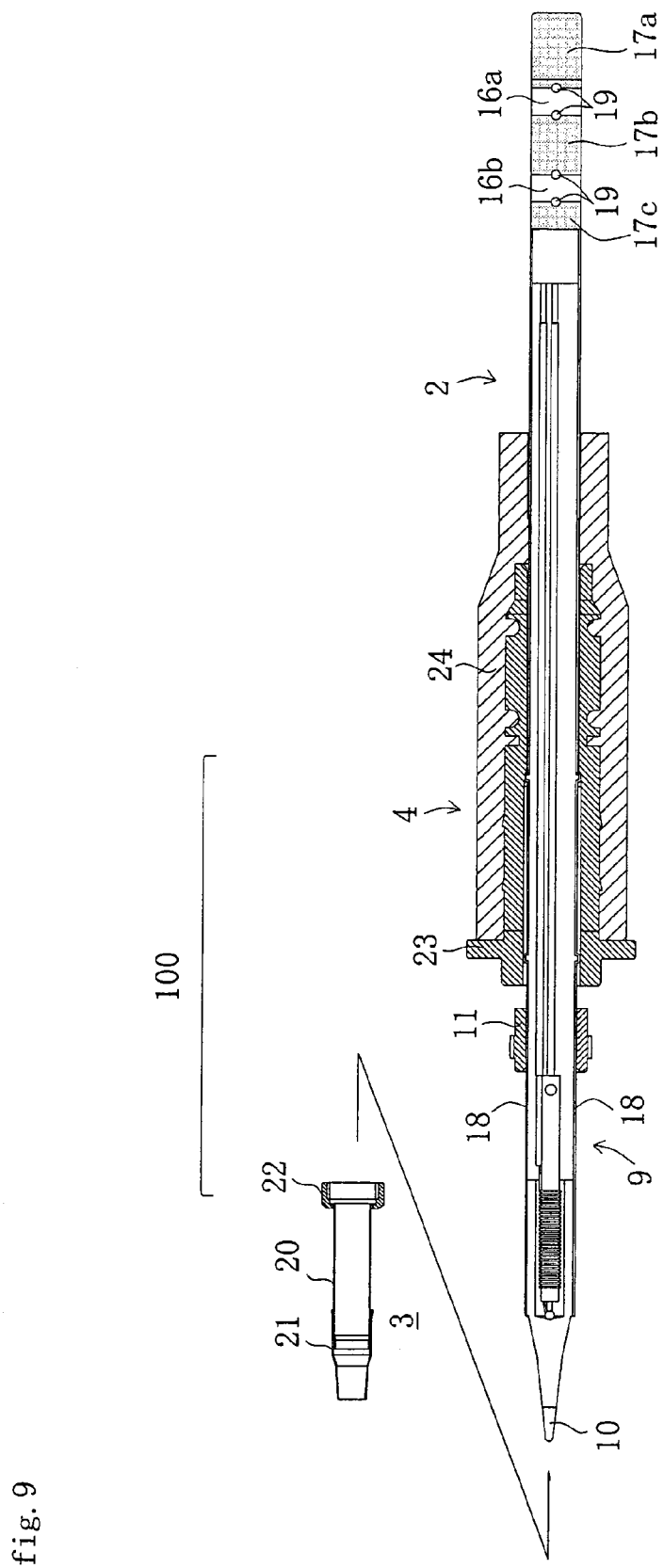
FIG. 9 is an enlarged view of a portion of FIG. 8.

FIG. 8 is an exploded view showing the entire structure of a soldering iron 1A according to another embodiment. FIG. 8 corresponds to FIG. 2. FIG. 8 shows a gas-exhaust pipe 3, a heater cartridge 2, a grip handle 4, a handle base 5, a gas injector 6 and an electric connector 8. FIG. 9 is an enlarged view of a portion of FIG. 8, and shows the heater cartridge 2, the gas-exhaust pipe 3 and the grip handle 4. The heater cartridge 2 and the gas-exhaust pipe 3 are exchange members 100 which are exchanged if necessary. The heater cartridge 2 and the gas-exhaust pipe 3 are exchanged for new exchange members 100'. The heater cartridge 2 and the gas-exhaust pipe 3 are integrally formed with the grip handle 4. When the heater cartridge 2 and the gas-exhaust pipe 3 are exchanged for new exchange members 100', the heater cartridge 2 and the gas-exhaust pipe 3 may be separated from the grip handle 4 or the heater cartridge 2 and the gas-exhaust pipe 3 may be left as an integral piece together with the grip handle 4.

In this soldering iron 1A, the handle base 5 is divided into a first part 35 and a second part 36, and the first part 35 receives a top end 36a of the second part 36. The first part 35 of the handle base 5 is made of an elastic polymer, as well as an outer cylindrical body 24 of the grip handle 4. Thus, if the heater cartridge 2 is inserted into a handle base 5 when the heater cartridge 2 is to be exchanged, a base end (right side in FIG. 8) of the cylindrical body 24 enters into the first part 35 of the handle base 5, and the soldering iron 1A is air-tightly integrally assembled.

In the soldering iron 1 shown in FIG. 2, the first part 35 of the handle base 5 is provided at its tip end 35a with the gas injector 6. In the soldering iron 1A shown in FIG. 8, the second part 36 of the handle base 5 is provided at its base end 36b with the gas injector 6. Second holes 19 of the heater cartridge 2 are formed in the vicinity of annular terminals 16a and 16b formed on the side of the base end of the pipe body 16c at positions corresponding to the gas injector 6 (see FIG. 9). First holes 18 are formed at the same positions as those shown in FIG. 2, and the first holes 18 are formed at positions slightly closer to the tip end than the mounting part 11.

FIGS. 10(b) and (c) show the second part 36 of the handle base 5, a connection 43 and the gas injector 6 in their separated state. As shown in the drawings, the gas injector 6 has a plastic charging body 26 which is of substantially cylindrical shape as a whole. The charging body 26 is formed with a mounting opening 33, an introducing member 32 is threadedly inserted into the mounting opening 33, and a tube member 60 through which inert gas is supplied is connected to the introducing member 32. A guide hole which is perpendicular to the mounting opening 33 is closed with a sealing screw 30.

The charging body 26 is provided at its inner periphery with a tip end 26a having a screw groove, a base end 26b receiving a rubber bushing 7A fitted over the cable 7, and an annular small-diameter part 26c. An inner diameter of the annular small-diameter part 26c is substantially the same as an outer diameter of the cable 7. Therefore, if the cable 7 is inserted into the gas injector 6, the outer periphery of the cable 7 is fitted into the inner periphery of the annular small-diameter part 26c. Since the bushing 7A is tightly pushed into the base end 26b, in the assembled state of the soldering iron 1A, the air-tightness is established. Thus, inert gas introduced from the tube member 60 is preventing from flowing rearward by the annular small-diameter part 26c and the bushing 7A, and the inert gas flows only forward (leftward in FIG. 10).

Figure 6B:
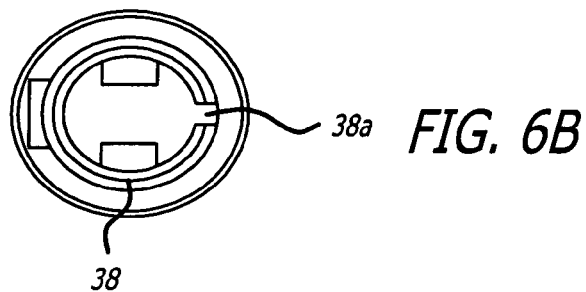
FIG. 6(b) is a front view of the conductive part shown in FIG. 6(a).
Figure 6C:
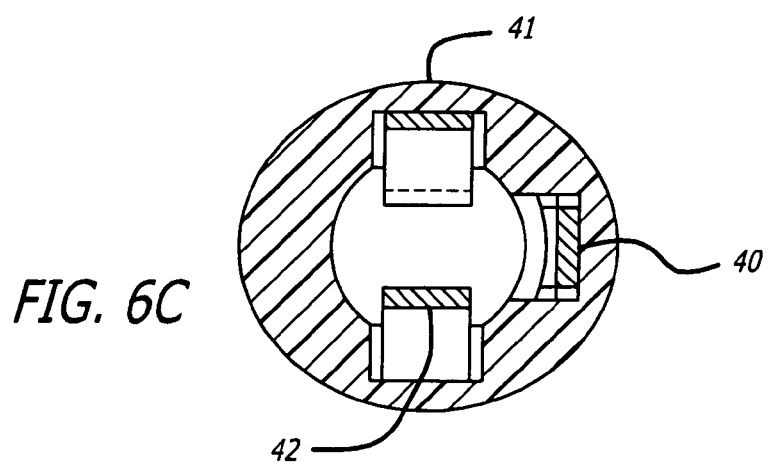
FIG. 6(c) is a cross-sectional view taken along a line A—A in FIG. 6(a).

As shown in FIGS. 8 and 10(c), the gas injector 6 and the handle base 5 are connected to each other through a translucent plastic connection 43. An electric connector assembly 37 shown in FIG. 6 is incorporated in the second part 36 of the handle base 5 (FIG. 10(a)). The structure of the connection 43 is the same as that shown in FIG. 5(b), and the connection 43 comprises a body 43a and mounting plates 43b and 43c (FIG. 10(c)). The body 43a is provided at its axially opposite ends with screw grooves. The mounting plates 43b and 43c project from the body 43a forward and backward in the axial direction. The cable 7 is fixed to the mounting plate 43c, and the electric connector assembly 37 shown in FIG. 7 is fixed to the mounting plate 43b.

The plastic body, 43a is formed with a through hole in the axial direction. Three conductive wires pulled out from the cable 7 are inserted through the through hole. The body 43a is also formed therein with a columnar lateral hole, a light-emitting diode 61 is inserted into the lateral hole, and the light-emitting diode 61 is connected, in parallel, to the heater 12 which extends by way of the annular terminals 16a and 16b. Therefore, the light-emitting diode 61 is lit at the same time as the electricity is fed to the heater 12, and a user can check the lightening state through the translucent body 43a.

The base end 36b of the second part 36 of the handle base 5 is formed at its inner periphery with a screw groove, and a tip portion of the body 43a is threadedly inserted into the base end 36b. A screw groove is formed also in a tip end 26a of the gas injector 6, and the base portion of the body 43a is threadedly inserted into the tip end 26a.

In the assembled state, the annular terminals 16a and 16b of the heater cartridge 2 come into contact with the electric connector assembly 37, and electricity is supplied to the soldering tip 10. Inert gas introduced from the gas injector 6 flows through the through hole formed in the body 43a of the connection 43 and then, the inert gas is introduced into the opening 19 of the heater cartridge 2 through the gap formed in the electric connector assembly 37. According to this soldering iron 1A, the through hole formed in the body 43a serves as a passage of the three conductive wires pulled out from the cable 7, and also serves as a passage of the inert gas. In the assembled state, the outer cylindrical bodies 24 and the handle base 5 are integrally assembled and the tip end 35a of the first part 35 of the handle base 5 is closed with the outer cylindrical body 24 and thus, the inert gas is prevented from leaking.

When the handle base 5, the connection 43 and the gas injector 6 are to be assembled, the second part 36 of the handle base 5 is allowed to rotate, and its base end 35b is threadedly fitted with the connection 43. The bushing 7A is retracted toward the base end (rightward in the drawing) and in this state, the gas injector 6 is turned, and the tip end 26a of the gas injector 6 is threadedly fitted with the connection 43. Then, if the bushing 7A is moved forward and is pushed into the base end 26b of the gas injector 6, the entire soldering iron is integrally assembled.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A system for soldering and emitting inert gas, the system comprising
    a heater cartridge having a heater pipe, the heater pipe having a tip end and an electrical contact end, the heater pipe having a first hole near the tip end and a second hole near the electrical contact end, the heater pipe having a passage between the first and second holes to allow gas to enter through the second hole and exit through the first hole; and
    a handle base having a cavity adapted to receive and seal around the second hole of the heater pipe, the cavity of the handle base adapted to provide power to the electrical contact end and gas to the second hole of the heater pipe.

2. The system according to claim 1, where the heater cartridge has a grip handle between the tip end and the electrical contact end.

3. The system according to claim 2, where the grip handle has a tapered portion adapted to insert into the cavity of the handle base, where the taper portion of the grip handle forms a seal with the cavity to substantially prevent the gas within the cavity from leaking out of the cavity.

4. The system according to claim 1, where the cavity of the handle base has an electrical connector, a gas injector, and a channel between the gas injector and the electrical connector, the electrical connector adapted to receive the electrical contact end of the heater pipe to provide power to a heater within the heater pipe, and the gas injector adapted to provide gas that flows through the channel and into the cavity.

5. The system according to claim 4, the handle base having a light connected to the electrical connector so that the light comes on when power is provided to the electrical connector.

6. The system according to claim 1, including an exhaust pipe adapted to enclose at least a portion of the tip end of the heater pipe to provide a gas passage between the exhaust pipe and the tip end of the heater pipe.

7. A cartridge type soldering iron capable of emitting gas, the soldering iron comprising:
    a heater pipe having a tip end and an electrical contact end, the heater pipe having a first hole near the tip end and a second hole near the electrical contact end, the heater pipe having a passage within the heater pipe between the first and second holes to allow gas to enter through the second hole and exit through the first hole; and
    a handle base releasably coupled to the electrical contact end of the heater pipe, the handle base adapted to provide power to the electrical contact end and gas to the second hole of the heater pipe, the handle base adapted to substantially seal around the second hole of the heater pipe to substantially prevent the gas from leaking from the cavity.

8. The soldering iron according to claim 7, the handle base having an electrical connector, a gas injector, and a channel between the gas injector and the electrical connector, the electrical connector adapted to receive the electrical contact end of the heater pipe to provide power to a heater within the heater pipe, and the gas injector adapted to provide gas that flows through the channel and into the second hole of the heater pipe.

9. The soldering iron according to claim 8, the handle base having a light connected to the electrical connector so that the light comes on when power is provided to the electrical connector.

10. The soldering iron according to claim 7, including an exhaust pipe adapted to enclose at least a portion of the tip end of the heater pipe to provide a gas passage between the exhaust pipe and the tip end of the heater pipe.

11. The soldering iron according to claim 7, including a grip handle between the tip end and the electrical contact end of the heater pipe, the grip handle having a taper portion, the handle base having a cavity adapted to receive the electrical contact end of the heater pipe and the taper portion of the grip handle to form a seal between the taper portion and the cavity so that gas is substantially prevented from leaking between the cavity and the taper portion of the grip handle.

12. A cartridge type soldering iron capable of emitting inert gas, the soldering iron comprising:
   a heater cartridge having a heater pipe, the heater pipe having a tip portion and a base portion, the heater pipe adapted to transfer gas and power from the base portion to the tip portion of the heater pipe; and
   a handle base having a front cavity and a gas injector, the gas injector adapted to provide gas to the front cavity, the front cavity adapted to receive the base portion of the heater pipe and provide gas and power to the base portion of the heater pipe, and the front cavity adapted to substantially seal around the base portion of the heater pipe so that the gas is substantially prevented from leaking from the front cavity.

13. The soldering iron according to claim 12, where the heater pipe has a passage between the tip portion and the base portion, the tip portion having a first hole and the base portion having a second hole, where gas is able to enter the second hole and flow through the passage and exit through the first hole of the heater pipe.

14. The soldering iron according to claim 12, including a grip handle between the tip and base portions of the heater pipe, the grip handle having a taper portion, the front cavity of the handle base adapted to receive the base portion of the heater pipe and the taper portion of the grip handle to form a seal between the taper portion and the front cavity so that gas is substantially prevented from leaking between the front cavity and the taper portion of the grip handle.

15. The soldering iron according to claim 12, including a cable adapted to provide power to the electrical connector within the front cavity, the electrical connector adapted to receive the base portion of the heater pipe to provide power to the base portion of the heater pipe.

16. The soldering iron according to claim 15, the handle base having a light connected to the electrical connector so that the light is on when power is provided to the electrical connector.

17. The soldering iron according to claim 16, where the light is enclosed in a translucent material to illuminate the light when the light is on.

18. The soldering iron according to claim 12, where the handle base has a channel extending between the gas injector and the front cavity, the front cavity providing gas to the base portion of the heater pipe when the base portion of the heater pipe is within the front cavity.

19. The soldering iron according to claim 12, including an exhaust pipe adapted to enclose at least a portion of the tip portion of the heater pipe to provide a gas passage between the exhaust pipe and the tip portion of the heater pipe.

20. The soldering iron according to claim 12, where the handle base has a charging body cavity on the opposite end of the front cavity, the cable having a bushing end adapted to fit inside the charging body cavity such that a substantial seal is formed between the charging body cavity and the bushing end of the cable.

21. A cartridge type soldering iron capable of emitting gas, the soldering iron comprising:
   a heater cartridge having a heater pipe, the heater pipe having a tip portion and a base portion, the heater pipe adapted to receive gas and power from the base portion and pass the gas and power to the tip portion of the heater pipe; and
   a handle base having a cavity, the cavity adapted to receive the base portion of the heater pipe to provide power to the base portion of the heater pipe and a sealing means to substantially prevent gas from leaking from the cavity.

22. The soldering iron according to claim 21, where the handle base is capable of being used as a grip and having an electrical connector and a gas injector, the handle base adapted to provide gas from the gas injector to the cavity.

23. The soldering iron according to claim 21, where the heater cartridge has a grip handle between the tip portion and the base portion of the heater pipe, the grip handle having a taper portion, the handle base having a first part and a second part, the first part adapted receive and seal the taper portion of the grip handle, and the second part of the handle base adapted to receive and seal a bushing from a cable.

24. The soldering iron according to claim 23, where the first part of the handle base has at least one seal ring to substantially seal the taper portion of the grip handle within the first part of the handle base.

25. The soldering iron according to claim 23, where the cavity is formed within the second part of the handle base.

* * * * *